(12) United States Patent
Pennec et al.

(10) Patent No.: US 8,599,862 B2
(45) Date of Patent: Dec. 3, 2013

(54) DATA ACQUISITION MODULE AND CABLE CONNECTOR

(75) Inventors: Daniel Pennec, Suce sur Erdre (FR); Fabien Le Moine, Bain de Bretagne (FR); Hubert Dieulangard, Saint Luce sur Loire (FR)

(73) Assignee: Sercel, Carquefou (FR)

( * ) Notice: Subject to any disclaimer, the term of this patent is extended or adjusted under 35 U.S.C. 154(b) by 395 days.

(21) Appl. No.: 12/959,119

(22) Filed: Dec. 2, 2010

(65) Prior Publication Data

US 2011/0098079 A1   Apr. 28, 2011

Related U.S. Application Data

(63) Continuation-in-part of application No. 11/262,956, filed on Nov. 1, 2005, now Pat. No. 7,869,444.

(30) Foreign Application Priority Data

Jul. 28, 2005 (FR) ...................................... 05 08070
Aug. 4, 2010 (FR) ...................................... 10 56443

(51) Int. Cl.
  *H04L 12/28* (2006.01)
(52) U.S. Cl.
  USPC ........................ 370/400; 370/338; 340/870.01
(58) Field of Classification Search
  USPC ............................... 370/400, 338; 340/870.01
  See application file for complete search history.

(56) References Cited

U.S. PATENT DOCUMENTS

| | | |
|---|---|---|
| 4,528,439 A | 7/1985 | Marney |
| 4,583,206 A | 4/1986 | Rialan et al. |
| 4,891,694 A | 1/1990 | Way |
| 5,454,037 A | 9/1995 | Pacella |
| 6,002,641 A | 12/1999 | Chien |
| 6,219,620 B1 | 4/2001 | Park et al. |
| 6,531,965 B1* | 3/2003 | Kaiser et al. ............. 340/870.01 |
| 2002/0065058 A1 | 5/2002 | Gatherer et al. |
| 2002/0174441 A1 | 11/2002 | Marin et al. |
| 2004/0004907 A1* | 1/2004 | Austad et al. .................. 367/154 |
| 2005/0104747 A1* | 5/2005 | Silic et al. ..................... 340/944 |
| 2005/0130701 A1 | 6/2005 | Zendle |
| 2005/0246137 A1 | 11/2005 | Brinkman |
| 2006/0009911 A1* | 1/2006 | Burkholder et al. ............ 702/18 |
| 2006/0291327 A1* | 12/2006 | Barakat .......................... 367/14 |

FOREIGN PATENT DOCUMENTS

| | | |
|---|---|---|
| EP | 1 401 150 A2 | 3/2004 |
| FR | 2 511 772 A1 | 2/1983 |
| FR | 2889389 A1 | 2/2007 |

OTHER PUBLICATIONS

French Preliminary Search Report dated May 17, 2011 during the prosecution of French Application No. 1056443.

* cited by examiner

*Primary Examiner* — Wei Zhao
(74) *Attorney, Agent, or Firm* — Fulbright & Jaworski LLP

(57) ABSTRACT

Networks of data acquisition modules may include wireless and cabled networks. The data acquisition modules may include no antennas, one antenna, or two antennas. The antennas may be removable from a port on the data acquisition node allowing a common module design between the wireless and cabled networks. A rigid shell with arms may be constructed to house the antennas and a cable connector. The rigid shell may protect the antennas during transport, installation, and use of the data acquisition modules. For example, when driving a module into the ground, the rigid shell may prevent damage to the antennas.

17 Claims, 12 Drawing Sheets

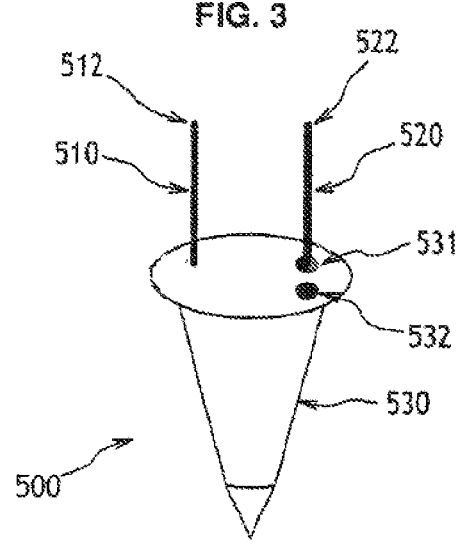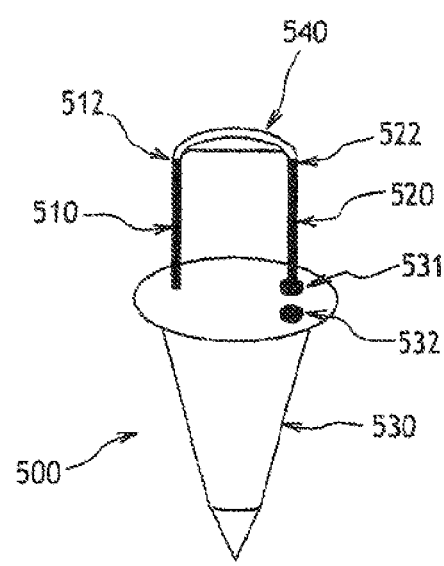

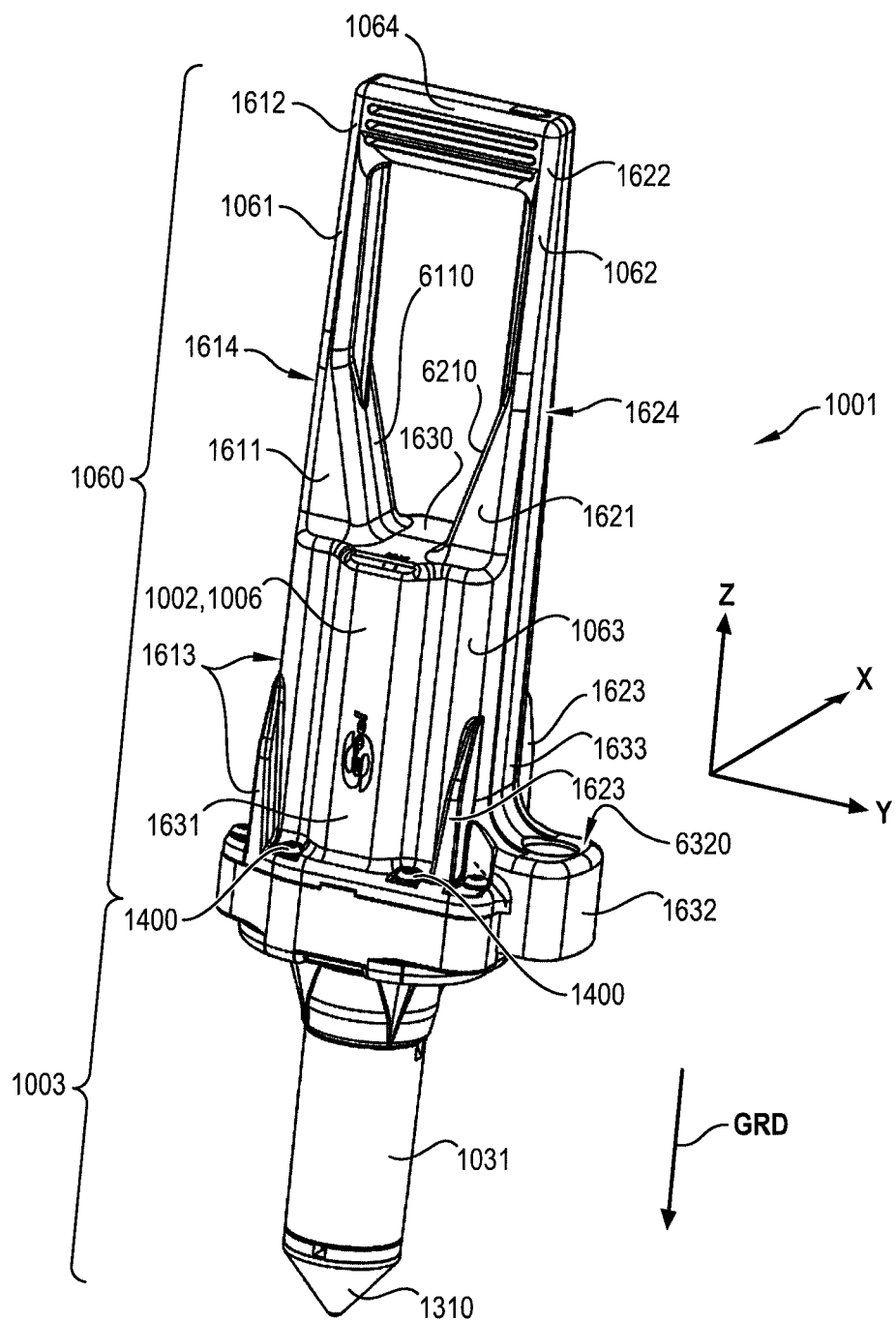

DATA ACQUISITION MODULE AND CABLE CONNECTOR

CROSS-REFERENCE TO RELATED APPLICATIONS

This application is a continuation-in-part of co-pending U.S. application Ser. No. 11/262,956 to Jean-Paul Menard et al., filed on Nov. 1, 2005, and entitled "Mixed Wireless and Cabled Data Acquisition Network."

TECHNICAL FIELD

The present disclosure generally relates to a data acquisition module. More specifically, the present disclosure relates to seismic sensors for petroleum prospecting.

BACKGROUND

Seismic sensors measure an artificial seismic response wave reflected by different layers of the subsoil after initiating a predetermined artificial seismic interrogation wave (ground shaking) on the surface of the terrain by a source controlled by an operator. Examples of seismic sensors include geophones or accelerometers having sufficient sensitivity for measuring the response wave reflected in the ground. Following ground shaking, each seismic sensor acquires seismic data. The seismic data may be digitized and transmitted to a base station for later processing. The transmission is conventionally accomplished by wire link (for example a cable) or by radio link.

To conduct petroleum prospecting over a large tract of land, which may measure several kilometers by several kilometers, an operator distributes modules over the land. Cartography of the subsoil corresponding to the land is then possible from the seismic data measured at each node and is exploited to identify the potential presence of petroleum.

A seismic acquisition device of cellular type may be used by dividing the land into cells, such that each cell includes an access node to the cell and geophone units. The geophone units transmit digital data via wireless link, for example, at 2.4 GHz to their cell's access node, and the access nodes transmit data to a central control unit. However, cellular transmission of seismic data in this arrangement has a relatively high cost of installation of cellular hardware. Additionally, without cables to transfer power to the seismic sensors each seismic sensor requires an onboard battery.

When the cellular network transmits data in a radio frequency band requiring authorization of use administrative steps may slow down the process of deployment of a prospecting mission. Alternatively, the acquisition modules may transmit in a free band such as, for example, in the 2.4 to 2.48 GHz band or in the 5.4 to 5.8 GHz band. But, antennas operable on these bands have low gain and low height, which may hinder operation when the acquisition module is located in a zone where data transmission conditions are difficult. For example, when the antennas of data acquisition modules are covered by excessive grass height or when there is an obstacle on the communication path between two antennas.

In another solution, acquisition modules may transmit wireless data to an operator carrying a monitor in proximity to the sensor to download recorded data from the module. This arrangement is disadvantageous because the operator must physically move to each module to receive the data.

When installing, operating, or transporting data acquisition modules, the data acquisition modules may be subjected to aggressive external forces. For example, in order to install a data acquisition module on terrain, a user grips the module and force a part of it in the ground or on the ground. Antennas are fragile and often break if large force is exerted on them. Additionally, the data acquisition module may be subjected to numerous aggressive external forces prior to being deployed on terrain. For example, the data acquisition modules may be unloaded from a truck or helicopter and piled on the ground so that personnel can distribute them to different positions on the ground. These external forces present an additional complication to the design of a data acquisition network, and in particular to wireless data acquisition modules.

SUMMARY OF THE INVENTION

According to one aspect of the disclosure, a data acquisition module includes a body, a first antenna and a second antenna coupled to the body, a seismic sensor coupled to the body, for measuring seismic data, a communication circuit for sending seismic data through at least one of the first antenna and the second antenna, and a handle coupled to the first antenna and the second antenna at distal ends of the first antenna and the second antenna away from the body.

According to another aspect of the disclosure, a data acquisition module includes a first antenna, a second antenna, a handle, and a body. The body includes a communication circuit for sending data through at least one of the first antenna and the second antenna, an input coupled to the communication circuit for receiving seismic measurements, and an upper shell having a first and a second arm for protection of the first and second antenna, respectively, in which the first arm includes a first lower part coupled to a housing of the upper shell and a first upper part, and in which the second arm includes a second lower part coupled to the housing of the upper shell and a second upper part, and in which the handle is attached to at least one of the first and second upper parts.

According to embodiments of this disclosure, a data acquisition module may include a first and second data-communication antennas, a handle, and a body. The body may include a communication circuit for sending data via at least one of the first and second communication antennas. The body may also include input means for input of said data in the communication circuit. The input means may include an input interface for input of seismic measurements coupled to at least one seismic sensor providing seismic measurements of at least one seismic magnitude.

The body of the module may include an upper shell having at least first and second arms for protection of the first and second antennas, respectively. The first and second antennas may be confined to the interior of the first and second arms, respectively. The first arm may include a first lower part attached to a housing of the upper shell and a first upper part. The second arm may include a second lower part coupled to the housing of the upper shell and a second upper part. The handle may be coupled to at least one of the first and second upper parts of the arms without being coupled to the first and second antennas. The shell may serve to maintain the antennas in a preset position relative to the ground, serve as protection for the electronic circuit and antennas, serve as gripping or hooking handle, and serve as a stiffener.

According to an embodiment of the disclosure, the first and second arms are created from a single piece with the handle and with the housing. Thus, a greater rigidity and greater production simplicity is achieved by reducing assembly stages.

In an embodiment of the disclosure, data sent and received by a data acquisition module may include seismic data such as, for example, seismic measurements, quality test control data, global positioning system (GPS) positioning data, and GPS time-stamping data. The module may wirelessly send and receive a large variety of data via the same communication circuit and the first and second antennas. The module may serve as a relay for all data linked to seismic measurement data.

The handle may be connected to the first and second upper parts of the arms. At least one of the lower parts may widen out in the direction from the upper part to the housing. The resistance of the arms of the module to shocks may be increased by reinforcing the joint of the arms with the rest of the module. The shell may be constructed from a single piece by molding plastic material.

In an embodiment of the disclosure, the arms may extend in a direction between their lower part and their upper part. The first and second antennas may include first and second printed circuits extending in the direction on first and second parts of an electrically-insulating board. The board may include a third part having a third printed circuit in a different plane relative to the first and second parts of the board. The third printed circuit may be coupled to the first and second printed circuits.

In an embodiment of the disclosure, the third part of the board may be folded relative to the first and second parts of the board into first and second thinned zones of the board. The third printed circuit may be coupled to the first and second printed circuits by a printed circuit on the first and second thinned zones.

In an embodiment of the disclosure, the third part of the board is separate relative to the first and second parts of the board. The third printed circuit may be coupled to the first and second printed circuits by at least one electrical connector.

In an embodiment of the disclosure, the body may include a lower tip for planting in the ground. In another embodiment, the body may include a base for positioning on the ground.

In an embodiment of the disclosure, the housing of the upper shell may be located above the communication circuit.

In an embodiment of the disclosure, at least one of the lower parts may serve to stiffen the arm.

In an embodiment of the disclosure, the upper shell includes on its external surface at least one fastening part for fastening of a corresponding part of a cable connector. At least one of the first and second arms may include, above the housing, an abutment surface which is insulating and constructed of material allowing the electromagnetic signals from the antennas to pass through and serving as application of an insulating part of the cable connector containing a third antenna attached to a cable solid with the connector. The abutment surface may be arranged to serve as a mechanical stop to the insulating part of the connector and as a spacer when the corresponding part of the connector is fixed on the fastening part located on the shell for keeping a preset electromagnetic coupling distance between the first and/or second antenna and the third antenna for allowing data communication between them.

In an embodiment of the disclosure, the fastening part may be located on the shell and include on its external surface at least one of a recess, a projection, and a rib. The shell may include mechanical parts for easily enabling removable mounting of the connector on the module.

In an embodiment of the disclosure, the fastening part may be located on the lower part of the arms. In another embodiment of the disclosure, the fastening part may be located on the housing on a side wall of the housing located at a distance from an upper face of the latter, which is coupled to the arms.

In an embodiment of the disclosure, the first arm may be located on the left and the second arm may be located on the right. The abutment surface may be located on the left side of the first arm or on the right side of the second arm to be turned to the exterior relative to the other of the arms. The first fastening part may be located at the front relative to the arms and the second distinct fastening part may be located to the rear relative to the arms.

In an embodiment of the disclosure, the housing of the upper shell includes a part which is located away from the handle and away from the first and second antennas. The upper shell may also include a contactless battery-charging element.

In one embodiment of the disclosure, a cable connector for fastening on a data acquisition module may include a fastening part on at least another corresponding fastening part located on the upper shell of the module. The connector may include an insulating part containing a third antenna attached to a cable with the fastening part of the connector. The insulating part may be constructed of material allowing electromagnetic signals from the antennas to pass through. The insulating part may be arranged to serve as mechanical stop against an insulating abutment surface of at least one of the arms, when the fastening part located on the connector is fixed on the other fastening part located on the upper shell, to maintain a preset distance of electromagnetic coupling between the first and/or second antenna and the third antenna to allow data communication between them.

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure. It should be appreciated by those skilled in the art that the conception and specific embodiments disclosed may be readily used as a basis for modifying or designing other structures for carrying out the same purposes of the present disclosure. It should also be realized by those skilled in the art that such equivalent constructions do not depart from the spirit and scope of the disclosure as set forth in the appended claims. The novel features that are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings.

FIG. 3 is a schematic illustrating a sensor of a node of a data acquisition network according to one embodiment of the disclosure.

FIG. 4 is a schematic illustrating another embodiment of a sensor according to the disclosure.

FIG. 5 is a schematic illustrating a data acquisition module having a point for planting in the ground according to one embodiment of the disclosure.

DETAILED DESCRIPTION

Figure 1:
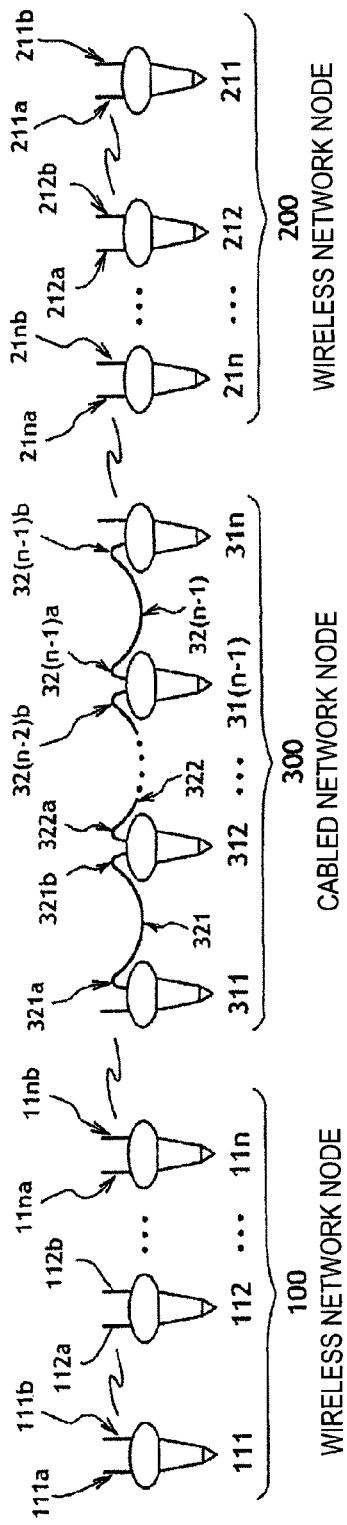
FIG. 1 is a schematic illustrating a data acquisition network according to one embodiment of the disclosure.

FIG. 1 is an illustration of a data acquisition network in accordance with one embodiment of the present disclosure. The network includes wireless networks of nodes 100 and 200 having nodes 111, 112, . . . , 11n, and 211, 212, . . . , 21n, respectively. Neighboring nodes of the networks 100 and 200 communicate with one another by radio frequency (RF) communication. The wireless networks 100 and 200 may also include at least one other network of nodes 300 having nodes 311, 312, . . . , 31n. Nodes of the network 300 may transmit data with other nodes of the network 300 through cables 321, 322, . . . , 32(n−1).

Nodes of the wireless networks 100 and 200 may each include at least two antennas (111a, 111b), (112a, 112b), . . . , (11na, 11nb) and (211a, 211b), (212a, 212b), . . . , (21na, 21nb). The antennas of one node of the wireless networks 100 and 200 are coupled to reduce the probability of extinction of the signal while affording spatial diversity in both sending and receiving. In place of an electrical coupling envisaged between the two antennas, an antenna switch (not shown) may be used according to one embodiment, which allows selection of one of the two antennas for transmission or reception. For example, a quality of radio links may be measured on each antenna and an antenna selected as a function of the quality of the link measured on each antenna.

The cabled network 300 may include nodes 311, 312, . . . , 31(n−1), 31n, which may be disposed successively. The nodes 311 and 31n relay data between the wireless network 100 and the cabled network 300, and between the wireless network 200 and the cabled network 300.

The protocol for data transmission on the cabled network 300 may be the same as the protocol used within the wireless networks 100 and 200. That is, the same radio-type protocol may be used on the cabled network 300 and the wireless networks 100 and 200. For example, the wireless networks 100 and 200 transmit data between nodes which are conveyed by a radio wave. When the data arrives at an input of the cabled network 300, the data originating from a wireless network 100 or 200 may still be conveyed by this radio wave, which now propagates in a cable rather than by RF. The transmission of data by radio waves within the cabled network 300 may be possible because the distance between two neighboring nodes of the cabled network 300 may be small.

The nodes 311 and 31n, located at the ends of the cabled network 300, may both be formed on the basis of a node having at least two antennas and of which at least one of these antennas, which may be removable, is mounted on a means of fixing able to receive a cable end. That is, the nodes 311 and 31n are nodes in accordance with the nodes used in the wireless networks 100 and 200, except for the difference that at least one of the antennas is removable, so that a cable can be plugged into the nodes 311 and 31n.

The nodes 312 to 31(n−1) of the cabled network 300 may include at least two antennas. At least two of the antennas, which may be removable, may be mounted on respective means of fixing able to receive cable ends 321a, 321b, 322a, . . . , 32(n−2)b, 32(n−1)a, 32(n−1)b. The nodes 312 to 31(n−1) are may be similar to nodes of the wireless networks 100 and 200 but include two antennas mounted on a means of fixing in a removable manner.

The successive nodes 311, 312, . . . , 31n of the cabled network 300 may be linked together in pairs by the cables 321, 322, . . . , 32(n−1), which are fixed by their respective ends (321a, 321b), 322a, . . . , 32(n−2)b, (32(n−1)a, 32(n−1)b), instead of the antennas, to the fixing means provided for this purpose.

The use of a radio protocol for the networks 100 and 200, like the cabled network 300, may be possible insofar as a distance separating two successive nodes of the cabled network 300 is small. Specifically, the attenuation curve for the radio waves is very favorable to waveguides over short distances. Thus, a cable-specific data transmission protocol separate from a wireless protocol may not be necessary and specific means for changing data transmission protocols at the level of the nodes 311 and 31n may not be necessary.

Figure 2:
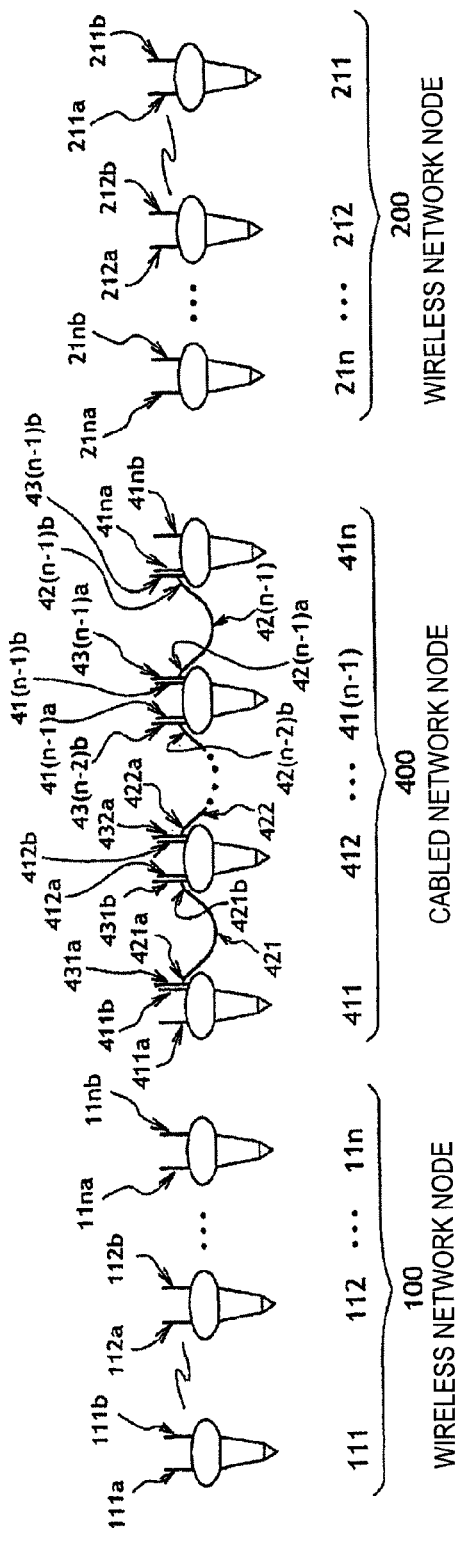
FIG. 2 is a schematic illustrating a data acquisition network according to one embodiment of the disclosure.

FIG. 2 illustrates a data acquisition network in accordance with one embodiment of the present disclosure. The data acquisition network of FIG. 2 may include wireless networks 100 and 200 and at least one cabled network of nodes 400. The cabled network 400 may include nodes 411, 412, . . . , 41(n−1), 41n linked together in pairs by cables 421, 422, . . . , 42(n−1).

End nodes of the cabled network 400, such as the nodes 411 and 41n, may serve as relays for data transmitted between the cabled network 400, the wireless network 100, and the wireless network 200. The nodes 411 and 41n may each include two antennas (411a, 411b) and (41na, 41nb) and each include at least one means of fixing able to receive a cable end, 421a and 42(n−1)b. These nodes 411 and 41n may be similar to the nodes used in the wireless networks 100 and 200, except that they may include a means of fixing able to receive a cable end.

The nodes 412, . . . , 41(n−1) of the cabled network 400 may be respectively formed on the basis of a node having at least two antennas (412a, 412b), . . . , (41(n−1)a, 41(n−ab)) and have at least two means of fixing able to receive cable ends (421b, 422a, . . . , (42n−2)b, 42(n−1)a).

Each cable 421, 422, . . . , 42(n−1) may link the nodes 411, 412, . . . , 41n, respectively, of the cabled network 400 and have at their respective ends an antenna (431a, 431b), 432a, . . . , 43(n−2)b, (43(n−1) a, 43(n−1)b). The antennas 431a, 431b, 432a, . . . , 43(n−2)b, 43(n−1)a, 43(n−1)b may be fixed by way of the ends of the cables 421, 422, . . . , 42(n−1) to the nodes 411, 412, . . . , 41n. According to one embodiment, the transmission of the data within the cabled network 400 may be performed, in part, by an electromagnetic coupling between the antennas 411b and 431a, the antennas 431b and 412a, . . . , 43(n−1)b and 41na. The cables 321, 322, . . . , 32(n−1) and 421, 422, . . . , 42(n−1) employed may be waveguides. According to one embodiment, the cables 321, 322, ..., 32(n−1) and 421, 422, ..., 42(n−1) may be coaxial cables.

FIG. 3 illustrates a sensor intended to form a node of a data acquisition network in accordance with that of FIG. 1 or 2. A sensor 500 includes a body 530, at least two antennas 510, 520, of which one at least of these two antennas is removable and fixed on a means of fixing 531 within the body 530, from which it may be disengaged. Antennas 510 and 520 have distal ends 512 and 522, respectively.

The sensor 500 may also provide at least one means of fixing 532 within the body 530 and disposed in proximity to the base of one of the antennas 510 and 520. The means of fixing 532 may receive a cable of type 421, 422, ..., 42(n−1), described with respect to FIG. 2, and having, at each of its ends, an antenna (431a, 431b), 432a, ..., (43(n−1)a, 43(n−1)b).

The proximity of the means of fixing 531 and 532 may create an electromagnetic coupling between the antennas to transmit data between one of the antennas 510 and 520 and an antenna disposed at the end of a cable of type 421, 422, ..., 42 (n−1).

FIG. 4 illustrates a sensor according to one embodiment of the disclosure in accordance with the sensor presented in FIG. 3. According to one embodiment, the sensor 500 further includes a handle 540 fixed to means of fixing (not shown) situated at ends 512 and 522 of the antennas 510 and 520, respectively. For example, the handle 540 may be screwed, nailed, tacked, or glued to the antennas 510 and 520. Alternatively, a shell (described below) encloses the antennas 510 and 520 and the handle 540 may couple to the shell. The handle 540 may exhibit numerous advantages. These advantages may include manual transport of the node, manual erecting/dismantling of the node, ease of deployment and of recovery by mechanical means of said nodes, and also ease of storage by suspension. The presence of the handle 540 between the antennas 510 and 520 may also improve the mechanical efficacy of these antennas.

The handle 540 may be equipped with a magnetic coil adapted to receive the energy of a charger of an induction battery external to the node. The battery (not shown) o may be recharged without contact to a charger. According to another embodiment, the handle 540 may be fitted with contacts so as to recharge the battery of the node with a charger which is external to the node.

According to one embodiment, all nodes of a network may be similar such that a single mode of manufacture may be used in manufacturing the nodes. For example, one node of the nodes 111, 112, ..., 11n, 211, 212, ..., 21n, 311, 312, ..., 31n, 411, 412, ..., 41n may be manufactured on the basis of a node having two removable antennas and having two cable end fixing means disposed on the body 530 of the sensor 500, so as to be usable interchangeably on-site.

According to another embodiment, a node of type 311, 31n may be used with nodes of type 412, ..., 41(n−1). In this embodiment, cables having an antenna at one of their ends and no antenna at the other end may be used. Also, nodes of type 411, 41n may be used with nodes of type 312, ..., 31(n−1). Cables linking two successive nodes of the cabled network may also include an antenna at one of their ends and no antenna at the other end. According to yet another embodiment, a cluster may be used interchangeable to form the cabled network of nodes from among the various types of nodes described hereinabove, namely the nodes 311, 312, ..., 5 31(n−1), 31n, 411, 412, ..., 41(n−1), 41n.

FIG. 5 is a schematic illustrating one embodiment of a data acquisition module having a point for planting in the ground.

A data acquisition module 1001 includes a body 1002 enclosing substantially all the electronic parts of the module 1001. A synoptic diagram of the electronic parts of two examples of module 1001 according to embodiments of the disclosure are presented in FIGS. 14 and 15. The body 1002 has a lower part 1003, which may allow positioning of the module 1001 in a determined direction relative to the ground and an upper part 1006 fixed to the lower (third) part 1003, for example by bolts 1400.

Figure 6:
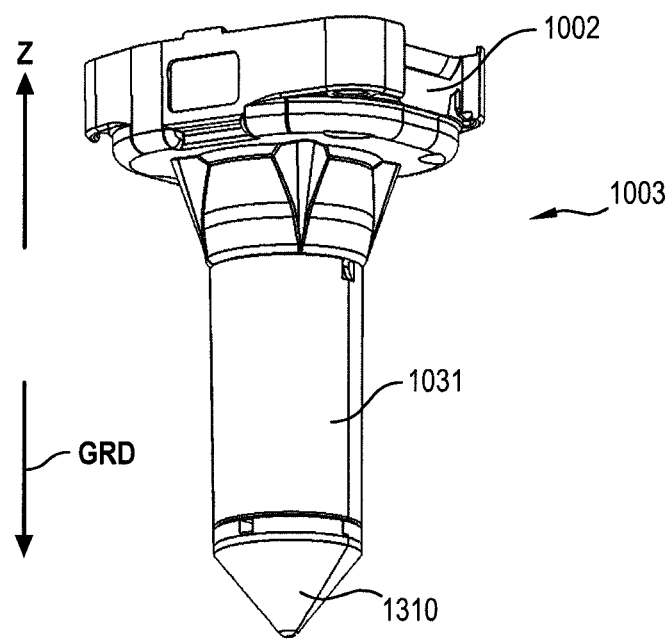
FIG. 6 is a schematic illustrating a planting point according to one embodiment of the disclosure.

In the embodiments of FIGS. 5 and 6, the lower part 1003 may be fitted with a lower foot 1031 terminating in a lower planting point or tip 1310 of the foot 1031 in the ground.

Figure 7:
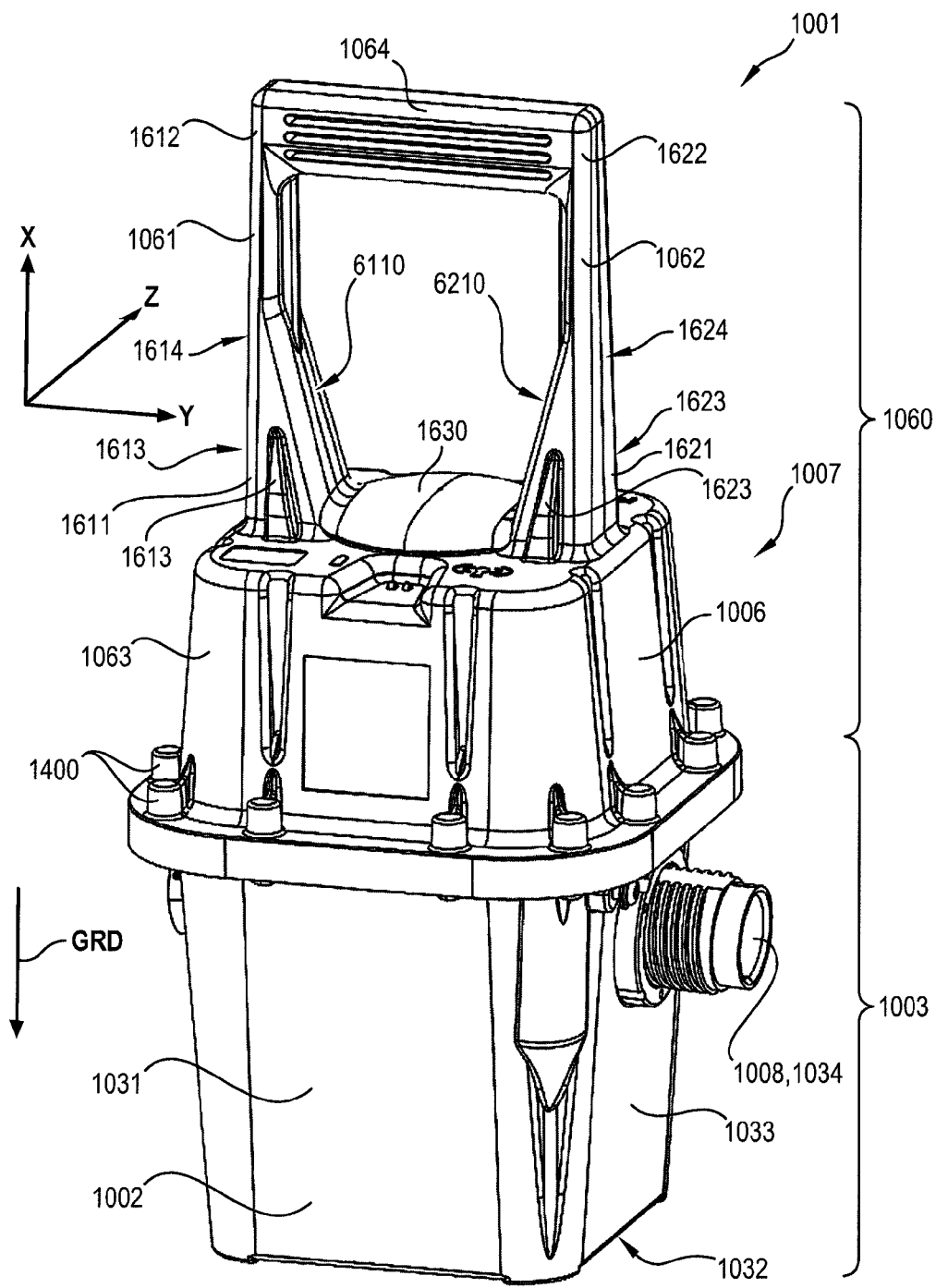
FIG. 7 is a schematic illustrating a data acquisition module having a base for placement on the ground according to one embodiment of the disclosure.
Figure 8:
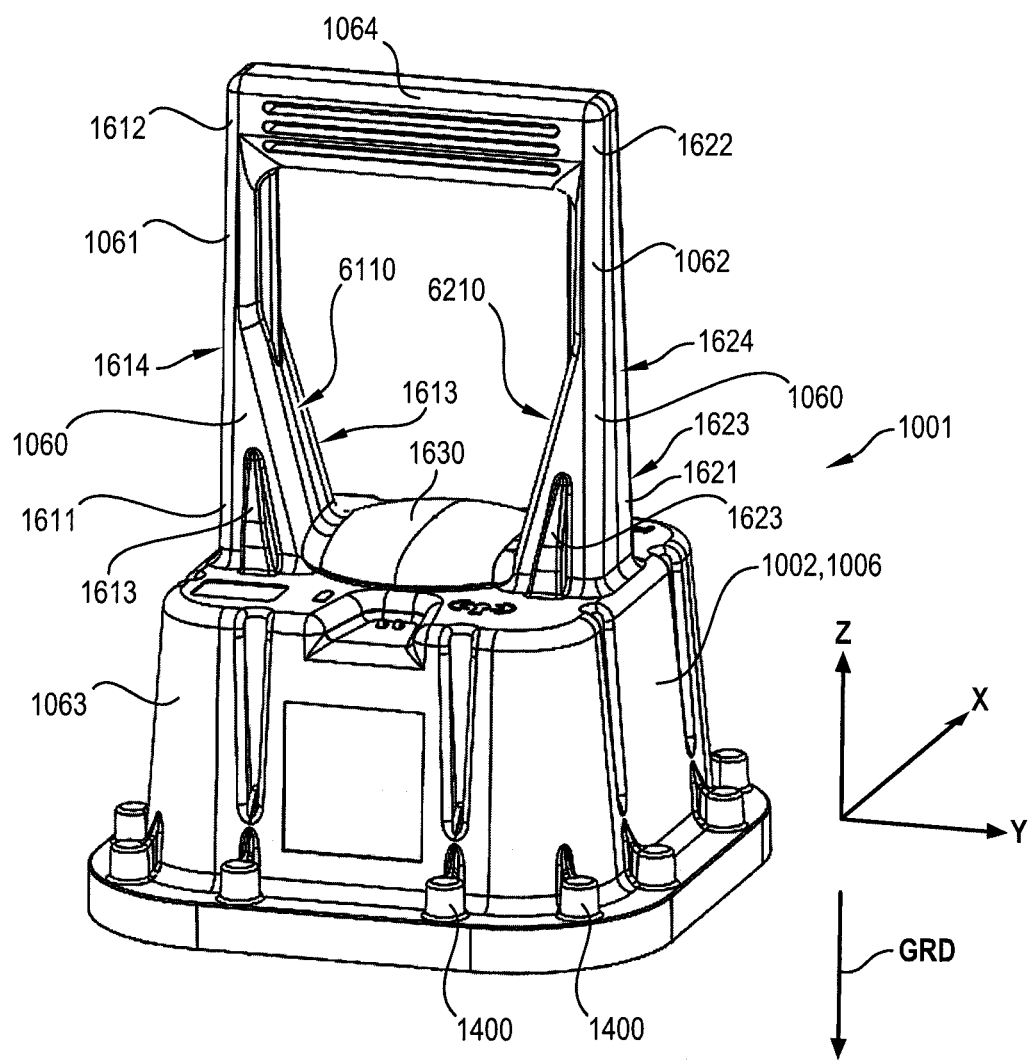
FIG. 8 is a schematic illustrating an upper part of a module according to one embodiment of the disclosure.

In the embodiments of FIGS. 7 and 8, the lower positioning part 1003 includes a base 1032, for example a flat surface, which may be placed on the ground.

Referring back to FIGS. 5 and 6, the lower part 1003 may be located under the upper part 1006 in a deposit direction GRD of the module 1001 on the ground for forcing into the ground. For example, the direction may be substantially vertically downwards (or inverse to the ascending vertical direction Z). The positioning part 1003 may be sunk into the ground. Alternatively, as illustrated in FIGS. 7 and 8, the positioning part 1003 may be placed on the ground. The module 1001 is known as a terrestrial seismic module 1001 when the positioning part 1003 is placed on the ground.

Figure 14:
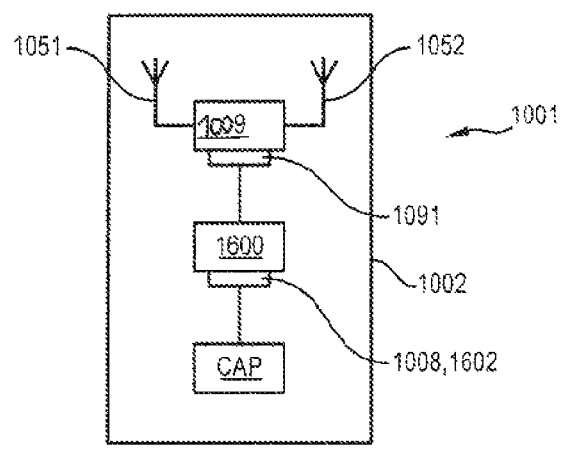
FIG. 14 is a schematic illustrating modular synoptics of electronic parts of a module according to one embodiment of the disclosure.
Figure 15:
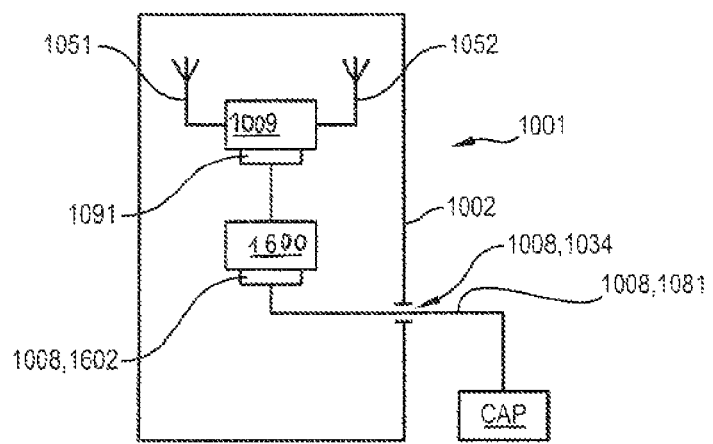
FIG. 15 is a schematic illustrating modular synoptics of electronic parts of a module according to another embodiment of the disclosure.

Referring to FIGS. 14 and 15, the data acquisition module 1001 may be fitted with an input interface 1008 for input of seismic measurements. The interface may be coupled to at least one seismic sensor (not shown) CAP providing seismic measurements of at least one seismic magnitude. The interface 1008 may be located between a data communication circuit 1600 and the seismic sensor or seismic sensors.

The seismic sensor may be, for example, positioned on or in the ground. According to one embodiment, the seismic sensor may be geophone for measuring an acoustic seismic velocity wave in the ground or an accelerometer for measuring seismic acceleration in the ground. The seismic measuring sensor may have sufficient sensitivity to detect and measure an artificial seismic wave constituted by the response of layers of the subsoil to an artificial seismic wave produced by shaking of the ground generated at the surface by a controlled source. Such seismic measuring sensors may have greater sensitivity than conventional vibration sensors used for example on machines tools or on automobiles.

According to one embodiment, the seismic sensor CAP may be housed in the body 1002, and the seismic data acquisition module 1001 may include an integrated seismic sensor CAP in the module 1001, as shown in FIG. 14. The seismic sensor may be housed in the lower part 1003 of the body 1002 as illustrated in FIGS. 5 and 6, in which the seismic measuring sensor is housed in the foot 1031 to be located in the ground when the planting tip 1310 is forced into the ground. In this embodiment, the seismic measurement input interface 1008 is located substantially within the body 1002 and includes, for example, an electrical coupling in the body 1002 between the seismic sensor CAP and a communication circuit 1600 communicating with the exterior of the body 1002 and of the module 1001.

According to another embodiment, the seismic sensor may not be housed in the body 1002. In this embodiment, the seismic data acquisition module 1001 may not include the seismic sensor and the connection between the seismic sensor, and the data acquisition module 1001 may be made during installation of the module 1001 on the ground. The seismic measuring sensor may send seismic measurements to the input interface 1008 as illustrated in FIG. 7, in which the input interface 1008 includes a connector 1602 located in the body 1002 and an access opening 1034 provided in a side wall 1033 of the lower part 1003 for one or more connection cables 1081 to pass through to couple the external seismic sensor or sensors to the appropriate connector 1602 via the opening 1034. The sensors may be, for example, one or more geophones implanted in the ground outside the module 1001 during installation on terrain for measuring a seismic acoustic wave in the ground.

The module 1001 may be configured: with one or more digital seismic sensors in the body 1002 (e.g., as shown in FIG. 14), with one or more analog seismic sensors in the body 1002 (e.g., as shown in FIG. 14), with one or more digital seismic sensors outside the body 1002 (e.g., as shown in FIG. 15), with one or more analog seismic sensors outside the body 1002 (e.g., as shown in FIG. 15), or with a mix of analog seismic sensors and digital seismic sensors.

The data acquisition module 1001 may include the communication circuit 1600 coupled to the first and second antennas 1051 and 1052 for sending and/or receiving, via at least one of the first and second antennas 1051 and 1052, seismic data corresponding to the seismic measurements, when the seismic measurements are sent to the interface 1008. The communication circuit may include more than two antennas.

The antennas 1051 and 1052 may be coupled to a support circuit 1009, which is coupled to the communication circuit 1600, with an electric connector 1091 located under the support circuit 1009. The support circuit 1009 may also be called the upper circuit 1009, which may be located high up relative to the others. According to another embodiment of the disclosure, the antennas 1051 and 1052 are coupled directly to the communication circuit 1600. Measurements taken by the seismic sensor and received by the interface 1008 may be transformed by the circuit 1600 into digital seismic data called second data.

The second data may be transmitted by the emission circuit 1600 to another data acquisition module, which is similar to the module 1001. Thus, transmission from module to module may be possible for collecting the data from successive seismic sensors by a remote central collecting unit (not shown). The communication circuit 1600 of the module 1001 and the antennas 1051 and 1052 may receive data from another data acquisition module. The data received by the circuit 1600 may be called first data, such that the circuit 1600 transmits second data and receives first data.

The communication circuit 1600 may be coupled to the first antenna 1051 and to the second antenna 1052, which are suitable for transmitting the second seismic data of the circuit, are suitable for receiving the first data, are suitable for wireless transmission of the second data, and are suitable for wireless reception of the first data.

The data sent and/or received by the antennas 1051 and 1052 and the communication circuit 1600 may include data other than seismic data. For example, the data may include one or more of: seismic data originating from the seismic sensor, quality control data, battery charge control data, global positioning system (GPS) dating data, and data relative to the operating state of the module. According to one embodiment, the antennas 1051 and 1052 may only transmit non-seismic data, and the seismic data may be recorded locally in a memory (not shown) of the module 1001. Quality control data may provide information on the environment of the module such as, for example, ambient noise, and decide to keep this measurement or not thereafter.

The data input means in the communication circuit 1600 may include the input interface 1008 for input of the seismic measurements of the seismic sensor or seismic sensors, in the sense that the data sent and/or received by the antennas and by the communication circuit 1600 may not be the seismic data corresponding to the seismic measurements, and that the communication circuit 1600 may have one or more input means other than the seismic measurement input interface 1008, for entering data other than seismic. The data input means may be, for example, a serial or parallel bus for receiving data such as a serial port or parallel port. With the presence of the seismic measurement input interface 1008 the module 1001 may be called seismic module 1001, but may still send and receive data other than seismic, without sending or receiving seismic data.

According to one embodiment, the upper part 1006 may include an upper shell 1060 and a first arm 1061 enclosing the first antenna 1051. The upper part 1006 may also include a second arm 1062 enclosing the second antenna 1052. The upper shell 1060 may be constructed from electrically insulating material. The shell 1060 may be constructed of material allowing penetration of the electromagnetic signals from the antennas 1051 and 1052. The upper shell 1060 may be constructed of, for example, plastics. The part 1003 may be, for example, in the form of a lower shell fixed to the upper shell.

The first arm 1061 may include a first lower part 1611 coupled to a housing 1063 of the upper shell 1060 located above the communication circuit 1600 and a first upper part 1612. The second arm 1062 may include a second lower part 1621 coupled to the housing 1063 of the upper shell 1060 and a second upper part 1622. A handle 1064 may be attached to at least one of the upper parts 1612 and 1622 of the arms 1061 and 1062 without being coupled to the antennas 1051 and 1052. Thus, the force exerted on the handle 1064 may be deflected from the antennas 1051 and 1052 by the shell 1060. The handle 1064 may be constructed from, for example, electrically insulating material.

The handle 1064 may be coupled to the first upper part 1612 of the arm 1061 and to the second upper part 1622 of the arm 1062 and extend between the first upper part 1612 and the second upper part 1622. The arms 1061 and 1062 may be constructed from a single piece with the handle 1064 and with the housing 1063 forming the rigid shell 1060. The handle 1064 may be, for example, in the form of a solid bar, in a single piece with the material of the arms 1061 and 1062.

The arms 1061 and 1062 may extend in a direction between the lower parts 1611 and 1612 and the upper parts 1621 and 1622. The antennas 1051 and 1052 may extend overall in this direction, which may be the direction GRD, to have an electromagnetic beam diagram transversal to this direction that is substantially in a horizontal plane when the direction is vertical or has a vertical component.

The handle 1064 may be attached to at least one of the upper parts 1612 and 1622 of the arms 1061 and 1062 without being coupled to the antennas 1051 and 1052 because the arms 1061 and 1062 form rigid envelopes 1061 and 1062, respectively, enclosing the antennas 1051 and 1052. The rigid envelopes 1061 and 1062 may be skewed oblong in this direction. Thus, the antennas 1051 and 1052 may be protected during handling of the module 1001.

During storage, transport, deployment, and use the modules 1001 may be subjected to mechanical stresses. In particular, when the data acquisition module 1001 is installed on terrain, the shell 1060 may substantially prevent the antennas 1051 and 1052 from breaking following the driving force exerted on the handle 1064 for sinking the tip 1310 into the ground or for placing the base 1032 on the ground or for positioning the lower part 1003 of the module 1001 on or in the ground, due to the fact that the handle 1064 is solid with the shell 1060 and in turn solid with the part 1003, the foot 1031, the tip 1310 and/or the base 1032. This may prevent breaking of the antennas 1051 and 1052 when the data acquisition modules 1001 clash during their transport or during their storage. Thus, the data acquisition module 1001 may have improved longevity.

The rigid envelopes 1061 and 1062 may be formed by the arms and have an inner passage for lodging the antennas 1051 and 1052. The rigid envelopes 1061 and 1062 may allow the circuit 1600 and the antennas 1051 and 1052 to have fragile forms which would not resist the force exerted on the handle 1064 in the absence of the upper shell 1060 and the arms 1061 and 1062. For example, the antennas 1051 and 1052 and the circuit 1600 may be, for example, printed circuit boards (PCB).

The lower parts 1611 and 1621 may allow the arms 1061 and 1062 to be stiffened to avoid flexion of the arms. The arms may have, for example, a wider part 1611, 1621 at the junction with the housing 1063. For example, the lower parts 1611 and 1621 (or at least one of the lower parts 1611 and 1621) may widen out in the direction GRD from the upper parts 1612 and 1622 to the housing 1063. For example, the lower parts 1611 and 1621 (or at least one of the lower parts 1611 and 1621) may have an inclined plane 6110 and 6210 turned towards the other arms 1061 and 1062. The inclined planes 6110 and 6210 may be formed by the handle 1064, the arms 1061 and 1062, and the housing 1063.

Figure 9:
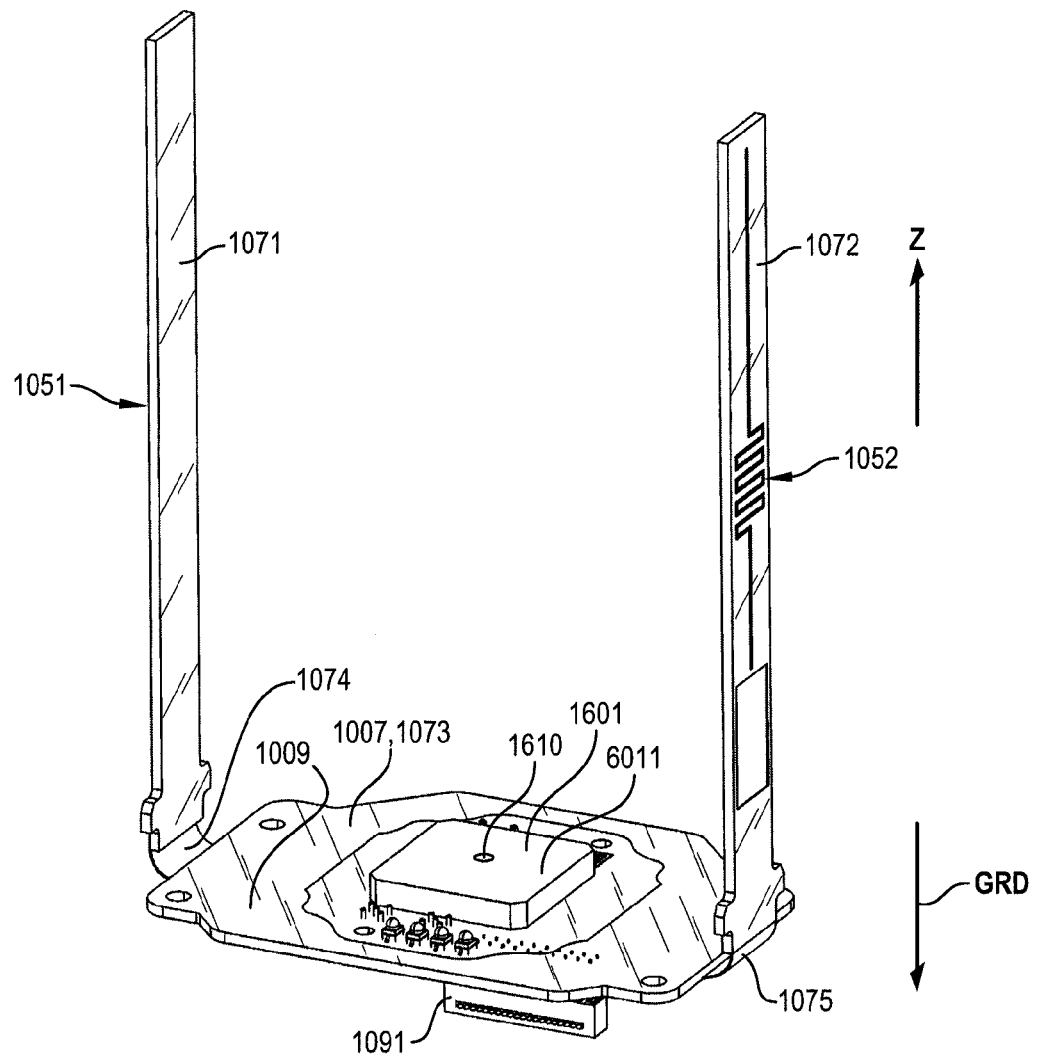
FIG. 9 is a schematic illustrating a circuit inside the module according to the one embodiment of the disclosure.
Figure 10:
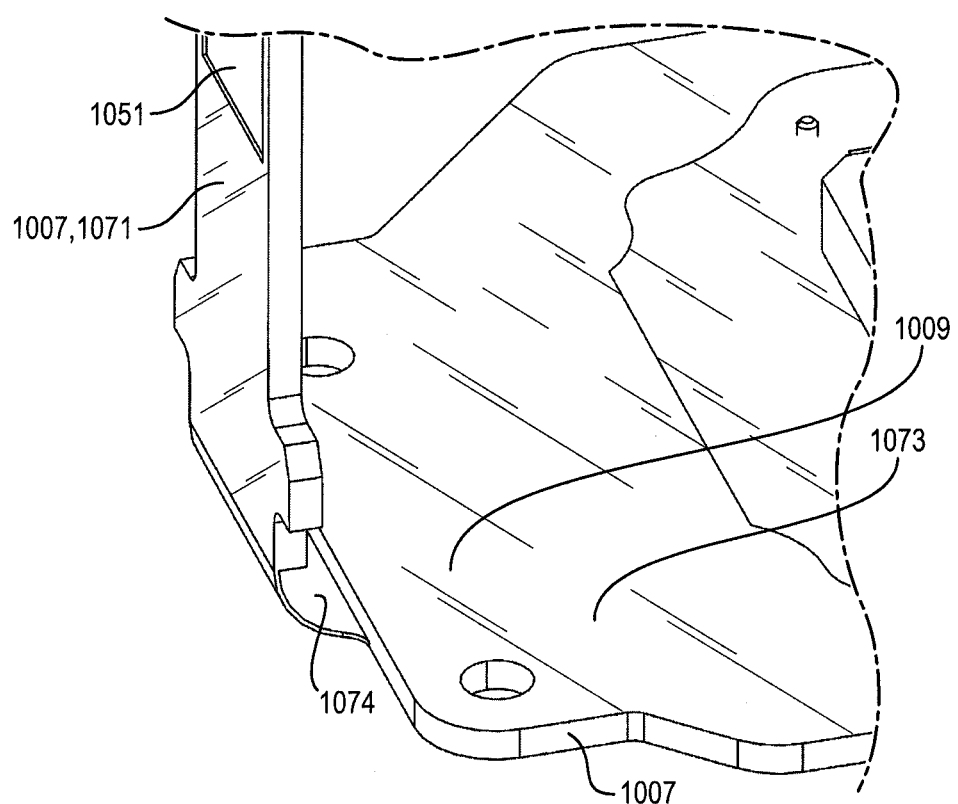
FIG. 10 is a schematic illustrating a part of the circuit according to one embodiment of the disclosure.

Referring now to FIGS. 9 and 10, the first and second antennas 1051 and 1052 may comprise first and second printed circuits 1051 and 1052 extending in the direction on first and second parts 1071 and 1072 of an electrically insulating board 1007. The board 1007 may include a third board part 1073, in which the printed circuit is coupled to the printed circuits 1051 and 1052. The third part 1073 of the board may be in a different plane relative to the parts 1071 and 1072 of the board. The third part 1073 of the board may be located, for example, in a secant plane and substantially perpendicular relative to the parts 1071 and 1072 of the board. The third part 1073 of the board may be located in the housing 1063 under the upper face 1630 between the arms 1061 and 1062.

The third part 1073 of the board 1007 may be folded relative to the first and second parts 1071 and 1072 of the board into two first and second thinned zones 1074 and 1075 of the board 1007. A printed circuit may be provided on each of the zones 1074 and 1075 for coupling the printed circuit 1051 forming the antenna 1051 and the printed circuit 1052 forming the antenna 1052 to the support circuit 1009 located on the third part 1073. The zones 1074 and 1075 may be made for example by milling of the insulating board, in which the insulating board may be suitable to be folded below a certain thickness.

According to one embodiment (not illustrated), the third part 1073 of the board 1007 may be separate relative to the first and second parts 1071 and 1072 of the board 1007. That is, the parts 1071, 1072, and 1073 may by three distinct printed circuit boards. The support circuit 1009 may be coupled to the first and second printed circuits 1051 and 1052.

The support circuit 1009 may also comprise on the upper face of the third part 1073 an electronic GPS positioning module 1601 for synchronization and time-stamping of the first data received and the second data sent. For example, the data may include a time in hours, minutes, seconds, and microseconds. This GPS module 1601 may include its own fourth GPS antenna 1610 for communication with GPS positioning satellites. The antenna 1610 may be, for example, provided on the upper face 6011 of the GPS module 1601, which is oriented upwards vertically in the direction Z when the module 1001 is positioned on the ground at the vertical in the direction GRD. Thus, the GPS antenna 1610 may be oriented to the upper face 1630 of the housing 1063.

Figure 11:
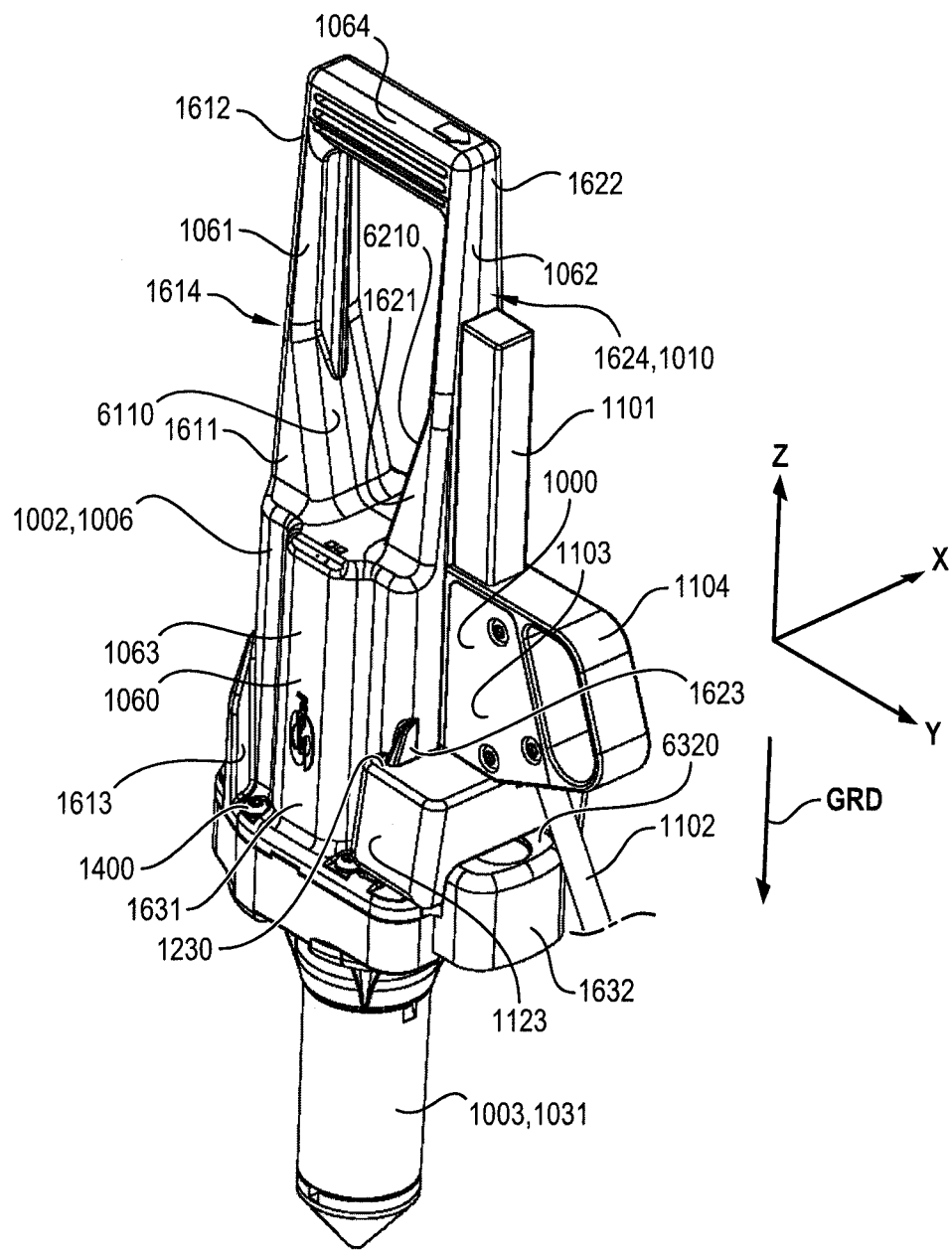
FIG. 11 is a schematic illustrating a cable connector intended to cooperate with one of the antennas of the module according to one embodiment of the disclosure.
Figure 12:
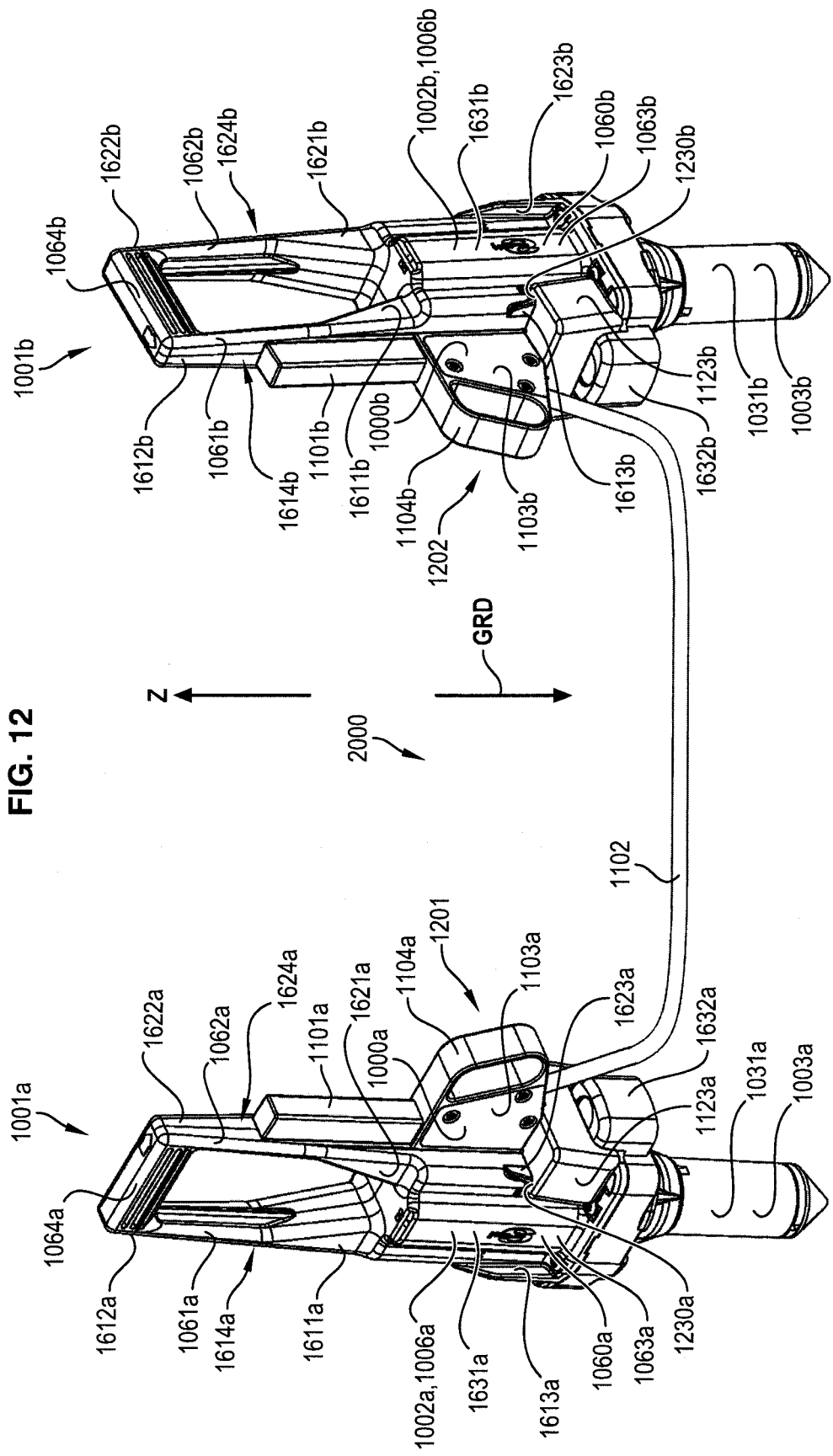
FIG. 12 is a schematic illustrating a cabled connection between two modules according to one embodiment of the disclosure.
Figure 13:
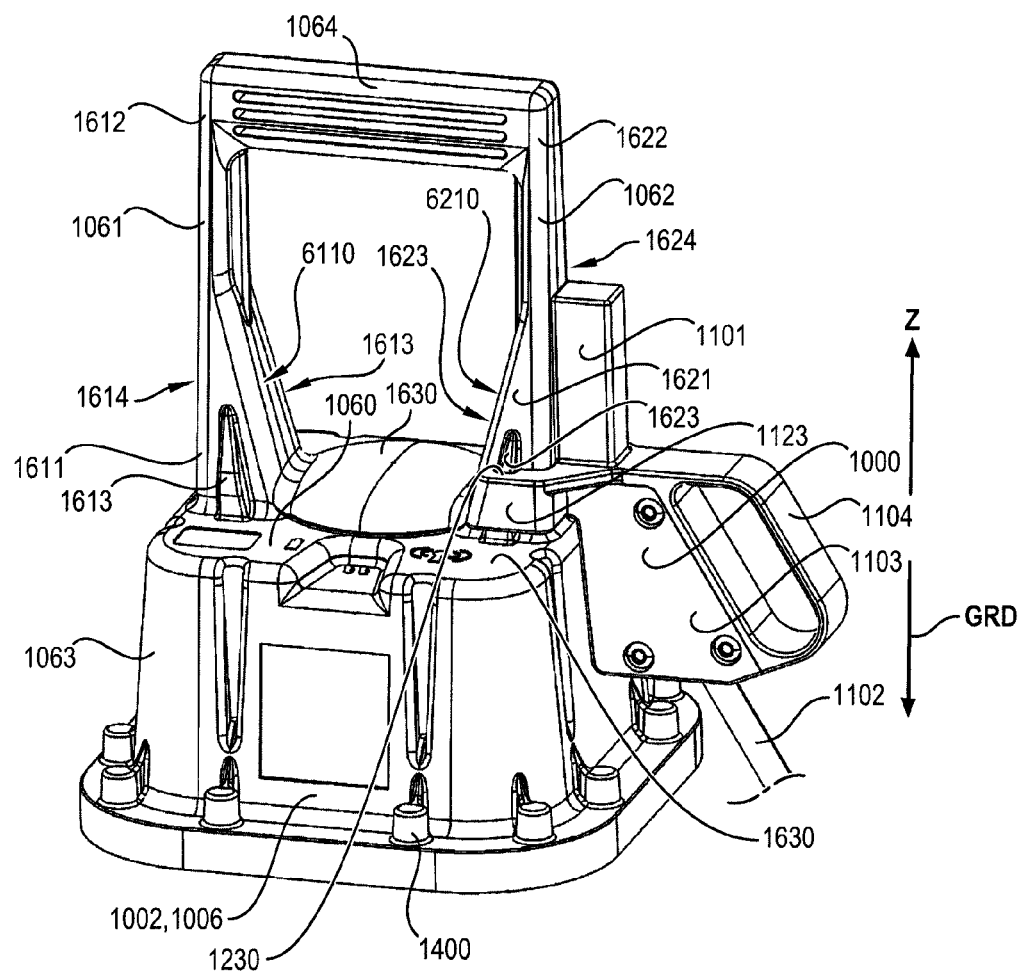
FIG. 13 is a schematic illustrating a cable connector according to one embodiment of the disclosure.

Referring now to an embodiment as illustrated in FIGS. 11, 12 and 13, the shell 1060 comprises on its external surface parts 1613 and 1623 for fastening a corresponding part 1123 of a cable connector 1000. The connector 1000 may be removably fixed on the fastening part 1613 and/or 1623. The cable connector 1000 may include a third antenna (not shown) attached to a cable 1102 with the part 1123. The connector 1000 may include a second body 1103 fixed to the cable 1102, to the fastening part 1123, and to a part 1101 containing the third antenna coupled to the cable by coupling means located in the body 1103. The cable 1102 may be, for example, a coaxial cable. The third antenna may be located inside the part 1101 as, for example, a dipole antenna.

At least one of the arms 1061 and 1062 may include insulating abutment surfaces 1614 and 1624 above the housing 1063, in which the surfaces 1614 and 1624 may serve to apply an insulating part 1101 located on the cable connector 1000. The insulating abutment surfaces 1614 and 1624 may be arranged to serve as a mechanical stop to the insulating part 1101 of the connector 1000 and as a spacer when the corresponding part 1123 of the connector 1000 is fixed on the fastening parts 1613 and 1623 located on the shell 1060 to maintain a preset distance of electromagnetic coupling between the first and/or second antennas 1051 and 1052 and the third antenna to allow data communication between the latter. The insulating abutment surfaces 1614 and 1624 and the insulating part 1101 may be constructed of material allowing the electromagnetic signals from the antennas to penetrate.

The fastening parts 1613 and 1623 may be located on the shell 1060 and may include at least one of the following: a recess, a projection, and a rib on its external surface. In the embodiments illustrated in this disclosure the fastening parts 1613 and 1623 are formed by ribs 1613 and 1623. According to one embodiment, as illustrated in FIGS. 7, 8, and 13, the fastening parts 1613 and 1623 may be located on the lower parts 1611 and 1621 of the arms 1061 and 1062. The ribs 1613 and 1623 may come to the upper face 1630 of the housing 1063. According to another embodiment, as illustrated in FIGS. 4, 11, and 12, the fastening parts 1613 and 1623 may be located on the housing 1063 on a side wall 1631 of the housing located at a distance from the upper face 1630 coupled to the arms 1061 and 1062.

According to other embodiments, the first arm 1061 may be located on the left and the second arm 1062 is located to the right relative to the direction GRD. The abutment surface 1614 may be located on the side left of the first arm 1061 to be turned to the exterior relative to the other arm 1062. The abutment surface 1624 may be located on the right side of the second arm 1062 to be turned to the exterior relative to the other arm 1061. A first fastening part 1613 may be located at the front relative to the arm 1061 and another first fastening part 1613 located to the rear relative to the arm 1061. A second fastening part 1623 may be located at the front relative to the arm 1062 and another second fastening part 1623 located to the rear relative to the arm 1062. The front and rear may be viewed in a direction X perpendicular to the direction GRD and to the transversal direction Y going between the arms 1061 and 1062. According to one embodiment, a cable connector 1000 may be placed on each arm 1061 and 1062. The body 1103 of the connector 1000 may be also fitted, for example, with a second handle 1104 located to the side away from the surface 1624 and opposite the application side 1010 of the part 1101 against the surface 1624, to allow simultaneous engagement the parts 1123, 1623, and/or 1613 against one another and support the part 1101 against the surface 1624 or 1614.

The part 1123 of the cable connector 1000 may have, for example, the form of a jaw gripping a front part of the rib 1623 and a rear part of the rib 1623 by a front part 1123 and another rear part 1123. The part 1123 of the connector 1000 may have, for example, a form complementary to the part 1623, having a complementary recess 1230 (as shown in FIG. 11) of the rib 1623. The rib 1623 and the recess 1230 may widen out, for example, from top to bottom to slip the connector 1000 onto the rib 1623 from top to bottom. The rib 1623 may be a recess, and the part 1123 may have a rib 1230. A connector, similar to the cable connector 1000, may be fixed on the other fastening part 1613.

FIG. 12 illustrates a cable connection device 2000 between two data acquisition modules 1001a and 1001b, similar to the module 1001 described above. The connection device 2000 includes a cable 1102 having at a first end 1201 a first connector 1000a coupled to the cable 1102 and at a second end 1202 a second connector 1000b coupled to the cable 1102. Below, an <<a>> is added to the reference signs of the connector 1000 and of the module 1001 described hereinabove for the connector 1000a and the module 1001a, and a <<b>> is added to the reference signs of the connector 1000 and of the module 1001 described hereinabove for the connector 1000b and the module 1001b. The connectors 1000a and 1000b may be similar to the connector 1000 described above and fixed by the fastening parts 1123a and 1123b, respectively to the parts 1623a and 1613b to apply the parts 1101a and 1101b, respectively, against the surfaces 1624a and 1614b. The module 1001a may be any one of the exemplary embodiments described above of the module 1001, and the module 1001a may be any one of the exemplary embodiments described hereinabove of the module 1001 and may be a different embodiment to the module 1001b.

A user may mount the cable 1102 removably on the modules 1001 without directly touching the ends of the cable 1102. In order to send to the module 1001b with the module 1001a in mounted position the data radiated by the antenna 1052a of the arm 1062a of the module 1001a transmits wirelessly to the antenna of the part 1101a of the connector 1101a and from there via the cable 1102 to the antenna of the part 1101b of the connector 1000b, and then to the antenna 1051b of the arm 1061b of the module 1001b. The connector 1000 may substantially prevent the ends of the cable 1102 from being fixed to the modules 1001. The electric transmission function of the ends of the cable 1102 may be separate from the mechanical fastening function ensured by the part 1123 of the connector 1000. Thus deterioration of the cable may be avoided because the forces applied to the fastening part 1123 are not transmitted to the cable 1102 during mounting on the module 1001 and/or in transport and storage conditions of the cable 1102.

The data acquisition module 1001 may include a contactless battery-charging element, which is contained in a part 1632 of the housing 1063 of the shell 1060. A battery of the module 1001 may be housed in the body 1002. For example, the battery may be housed in the housing 1063 of FIG. 5 or in the lower part 1007 of FIG. 7 or as a variant outside the body 1002. The battery may be coupled to the communication circuit 1060, to the seismic sensor, and to the electronic parts of the module 1001. The contactless battery-charging element may be, for example, a magnetic induction element. The part 1632 of the housing 1063 housing the contactless battery-charging element may include, for example, an element 6320 to mechanically lock with an external charger for removably mounting the external charger on this mechanical lock element 6320. When the charger is in the installed position on the mechanical lock element 6320 the charger contactlessly generates a charge current in the battery charge element contained in the part 1632 by magnetic induction. The part 1632 may be situated away from the arms 1061 and 1062 so as not to impede removable mounting of the cable connector 1000 and may be located, for example, on a side wall 1633 other than the wall 1631 on which the fastening elements 1613 and 1623 are located such as, for example, to the right or left side of the housing 1063 in the plane coupling the arms, considered as being a frontal plane.

Although the present disclosure and its advantages have been described in detail, it should be understood that various changes, substitutions, and alterations can be made herein without departing from the spirit and scope of the disclosure as defined by the appended claims. For example, the embodiments described above may include any number of arms, which may or may not carry an antenna. Moreover, the scope of the present application is not intended to be limited to the particular embodiments of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A data acquisition ground device, comprising:
   at least a first antenna and a second antenna;
   a body, comprising:
   a seismic sensor for measuring seismic data;
   a communication circuit for sending the seismic data through at least one of the first antenna and the second antenna,
   wherein the body has a lower body part located along a vertical axis under an upper body part comprising an upper rigid shell comprising:
   a first arm forming a first rigid envelope which is oblong along the vertical axis and encloses the first antenna extending along the vertical axis;
   a second arm forming a second rigid envelope which is oblong along the vertical axis and encloses the second antenna extending along the vertical axis; and
   a handle attached to at least one of a first upper arm part of the first arm and a second upper arm part of the second arm without being coupled to the first antenna and to the second antenna.

2. The data acquisition ground device of claim 1, further comprising a battery, in which the handle comprises a magnetic coil for receiving energy from a charger to charge the battery.

3. The data acquisition ground device of claim 1, further comprising a battery, in which the handle comprises contacts for receiving energy from a charger to charge the battery.

4. The data acquisition ground device of claim 1, in which the data, sent by the communication circuit through at least one of the first antenna and the second antenna, comprises at least one of seismic data from the seismic sensor, quality control data, battery charge control data, global positioning system (GPS) data, and data regarding an operating state of the data acquisition ground device.

5. The data acquisition ground device of claim 1, further comprising a port coupled to the body for receiving a cable.

6. The data acquisition ground device of claim 5, in which the port for receiving the cable is coupled to at least one of the first antenna and the second antenna.

7. The data acquisition ground device of claim 1, in which the seismic sensor is at least one of an accelerometer, a geophone, and a hydrophone.

8. A data acquisition ground device, comprising:
at least a first antenna and a second antenna;
a body, comprising:
a communication circuit for sending data through at least one of the first antenna and the second antenna; and
an input coupled to the communication circuit for receiving seismic measurements,
wherein the body has a lower body part located along a vertical axis under an upper body part comprising an upper rigid shell comprising:
a first arm forming a first rigid envelope which is oblong along the vertical axis and encloses the first antenna extending along the vertical axis;
a second arm forming a second rigid envelope which is oblong along the vertical axis and encloses the second antenna extending along the vertical axis; and
a handle attached to at least one of a first upper arm part of the first arm and of a second upper arm part of the second arm without being coupled to the first antenna and to the second antenna.

9. The data acquisition ground device of claim 8, in which the first and second arms are constructed from a single piece with the handle and a housing.

10. The data acquisition ground device of claim 8, in which the upper rigid shell has a housing, the first arm has a first lower arm part coupled to the housing, the second arm has a second lower arm part coupled to the housing, at least one of the first lower arm part and the second lower arm part widens out along a direction going from the corresponding upper arm part to the housing.

11. The data acquisition ground device of claim 10, in which at least one of the first lower arm part and second lower arm parts comprises an inclined plane turned towards the other of the first arm and second arm.

12. The data acquisition ground device of claim 8, in which the first and second arms extend in a direction between the corresponding lower part and upper part, and in which the first and second antennas include first and second printed circuits on a board, the board comprising a third printed circuit coupled to the first and second printed circuits and located on a different plane than the first and second printed circuits.

13. The data acquisition ground device of claim 8, in which the lower body part further comprises at least one of a lower tip for planting in the ground and a base for positioning on the ground.

14. The data acquisition ground device of claim 8, in which the upper rigid shell includes a first fastening part, on an external surface of the upper rigid shell, for fastening of a cable connector, and in which at least one of the first and second arms comprises, above the housing, an abutment surface which is insulating and constructed of material allowing electromagnetic signals from the first and second antennas to penetrate, and in which the cable connector includes a third antenna coupled to a cable by the cable connector, and in which the abutment surface is arranged to serve as a mechanical stop to an insulating part of the cable connector and as a spacer when the corresponding part of the connector is coupled to the first fastening part on the upper rigid shell for keeping a preset electromagnetic coupling distance between the at least one of the first and second antenna and the third antenna.

15. The data acquisition ground device of claim 14, in which an external surface of the fastening part comprises at least one of a recess, a projection, and a rib.

16. The data acquisition ground device of claim 15, in which the first arm is located on a left side of the upper rigid shell and the second arm is located on a right side of the upper rigid shell, and in which the abutment surface is located on at least one of a left side of the first arm and a right side of the second arm, and in which the first fastening part is located at the front of the upper rigid shell relative to the first and second arms, and in which the upper rigid shell includes a second fastening part located on the upper rigid shell opposite the first fastening part.

17. The data acquisition ground device of claim 8, further comprising a cable connector,
the cable connector comprising a fastening part; and
the cable connector comprising an insulating part having a third antenna coupled to a cable, in which the insulating part is arranged to serve as a mechanical stop against an insulating abutment surface of at least one of the first and second arms to maintain a preset distance of electromagnetic coupling between at least one of the first and second antennas with the third antenna.

* * * * *